UNITED STATES PATENT OFFICE.

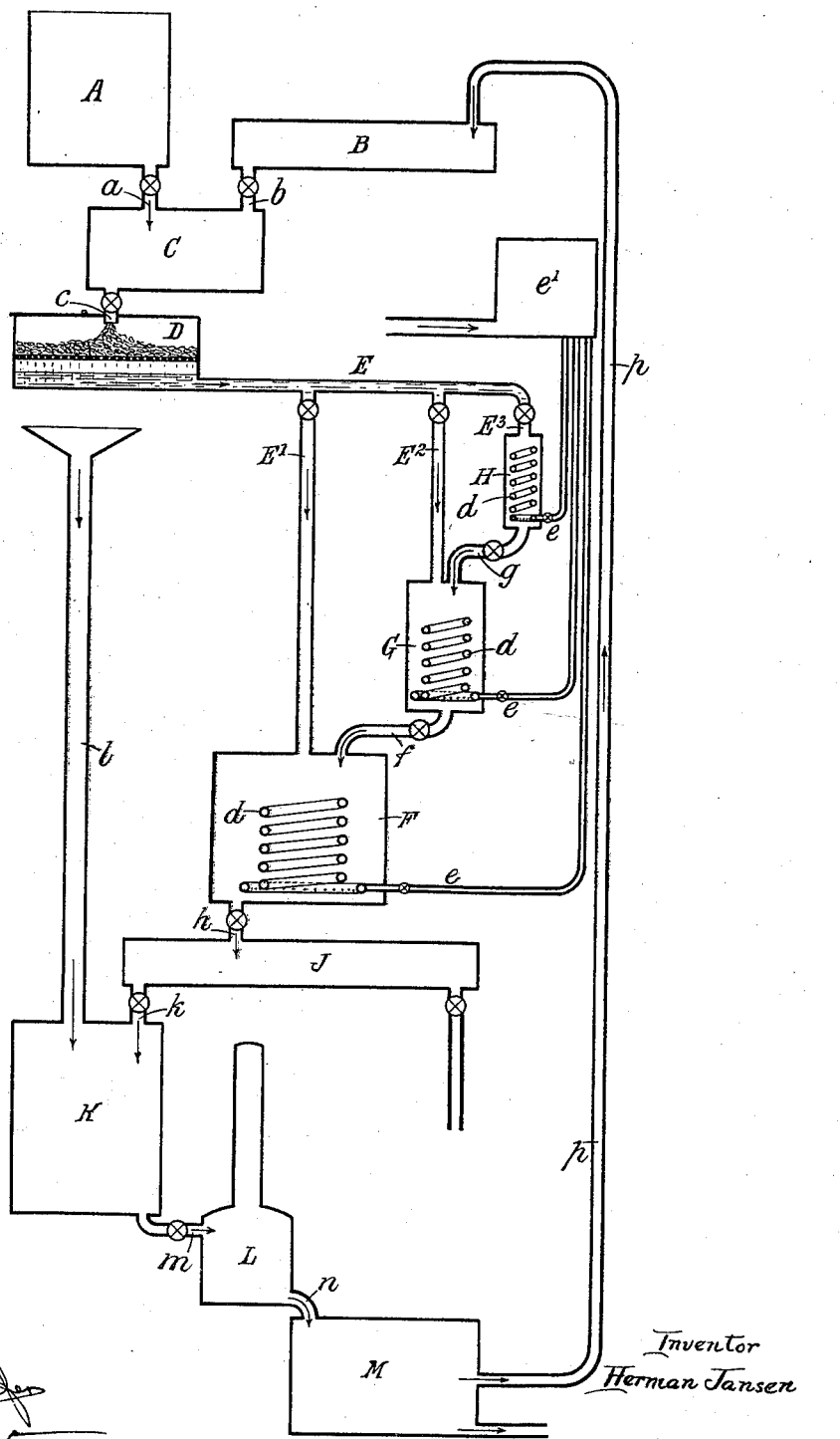

HERMAN JANSEN, OF SCHIEDAM, NETHERLANDS.

MANUFACTURE OF YEAST.

SPECIFICATION forming part of Letters Patent No. 613,149, dated October 25, 1898.

Application filed July 27, 1896. Serial No. 600,692. (No model.) Patented in England October 1, 1895, No. 18,296; in France October 10, 1895, No. 250,884; in Belgium October 16, 1895, No. 117,894; in Hungary December 9, 1895, No. 4,821, and in Austria March 18, 1896, No. 46/1,032.

*To all whom it may concern:*

Be it known that I, HERMAN JANSEN, yeast and spirit manufacturer, a subject of the Queen of the Netherlands, residing at Schiedam, Netherlands, have invented certain new and useful Improvements in the Manufacture of Yeast, (for which a patent has been applied for in Great Britain, No. 18,296, dated October 1, 1895, and patents have been obtained in France, No. 250,884, dated October 10, 1895; in Belgium, No. 117,894, dated October 16, 1895; in Austria, No. 46/1,032, dated March 18, 1896, and in Hungary, No. 4,821, dated December 9, 1895;) and I do hereby declare that the following is a full, clear, and exact description of the invention, which will enable others skilled in the art to which it appertains to use the same.

This invention relates to a process for producing a particularly large growth of yeast of most excellent quality in a solution of malted or unmalted grain ground, rolled, cooked, or steamed.

My said invention consists in a process of producing yeast, in which process the saccharified unfiltered wort from a mash prepared in the usual manner is mixed with spent wash and the mixture is left until the albuminous substances are peptonized, after which the said solid matters are separated or extracted. The result of this treatment is that the clear wort thus obtained is undeprived of the yeast-food which was previously contained in the solid matters of the wort and which in the analogous process heretofore adopted is not utilized for the making of yeast and spirit, but was removed from the wort with the solid matters, by filtration or otherwise, before the addition of the spent wash. After extraction of the solid matter the wort and the said solid matter are fermented independently. The fermentation of the wort is preferably brought about by adding to the said wort a nearly fermented wort, obtained, for example, by first sterilizing a small quantity of wort by heating it to a suitable temperature, then cooling and fermenting it with a pure yeast, meanwhile aerating it with purified air, adding the yeast so obtained to a second larger quantity of wort, and thereby fermenting the same, and then adding the yeast therefrom to the wort in the main aerating vat or vats. This provokes a very strong and particularly pure fermentation in the said wort, during which fermentation the wort is aerated and kept at a suitable temperature. When the yeast has been formed, it is separated from the wort and treated in the ordinary way. The solid matter obtained by the separation of the clear wort is brought into a vat and yeast of any description is added to this solid matter, and, if necessary, also so much spent wash, ordinary water, or such water as results from the pressing or the washing of the yeast as to make these solid matters sufficiently moist to render fermentation possible. Afterward the clear wort, treated as above mentioned and from which the yeast has been removed, is added to this solid matter in fermentation and the whole distilled. The wash resulting from this distillation is led into vats, where the solid matter settles, and from which after some time the clear spent wash is decanted and is ready to be used for a future operation. This separation of the clear spent wash can also be done by pressing, centrifugal force, or otherwise.

My said invention also partly consists in an apparatus for the manufacture of yeast, comprising a mashing-vat, a spent-wash tank, communicating pipes between said mashing-vat and said tank, a filter or other apparatus for extracting the solid matter from the wort, a series of fermenting-vats successively increasing in size, pipes to permit the heating, cooling, and aeration of the wort in said fermenting-vats, pipe connections between said filter and said fermenting-vats, a yeast-separating vat, a final fermenting-tank and pipe connections or passages between said filter and yeast-separating tank and said final fermenting-tank.

My improved apparatus may also comprise a distilling apparatus for distilling the residue from said final fermentation, a settling-tank for the wash from such distillation, and a pipe connection between said settling-tank and the spent-wash tank above mentioned.

In the accompanying diagram I have shown how my said invention may be conveniently and advantageously carried into practice.

A is a vat in which the grain is mashed.

B is a tank containing spent wash—i. e., the liquid part of the residue left in the still after the alcohol has been distilled off. The mash is allowed to remain in the vat A for a suitable time for saccharification, after which it is (without previously separating the solid matters) run through the pipe *a* into the tank C, where it is thoroughly mixed with spent wash from the tank B, the said wash entering the tank C through the pipe *b*. This spent wash is added to the mash in the proportion of about five thousand liters to one thousand kilos of grain in the mash, the temperature of the mixture being kept between 32° and 35° centigrade. In my improved process I do not boil the mash, which therefore still contains some active diastase, and this diastase is available for acting on any unfermentescible sugar or like compounds present in the wash and converting them into fermentescible sugar, thus largely augmenting the yield of spirit. The mixture above mentioned may possess an acidity of two and one-half or three per cent.; but this is found not to interfere with the activity of the diastase if the temperature of the mixture does not exceed 36° centigrade. By my improved method of conducting the fermentation hereinafter described I am enabled to prevent the development of bad ferments, and thus obviate the necessity of boiling the mash.

When the peptonization produced as above mentioned has been allowed to continue for about two hours, the wort is separated from the solid matter by means of a filter D, to which the mixture is supplied through a pipe *c*, and the said wort thence passes into the wort-conduit E, whence for the purpose of enabling a large quantity of mother-yeast in full growth to be sown into the main fermenting-vat, as above mentioned, it is distributed as follows: The greater part passes through the branch E' to the main fermenting-vat F, a smaller quantity through the branch E² to the small vat G, and a still smaller quantity through the branch E³ to the vessel H. Each of the said vessels F G H is provided with a heating-coil or serpentine *d* and an aeration-pipe *e*, the bottoms of the vessels G and H being in communication, respectively, with the vessels F and G through pipes *f* and *g*. The wort in the vessel H is first heated by means of the coil *d* to kill all possible bad ferments contained therein, then cooled down to the proper temperature by means of cooling liquids or fluids passed through the coil *d*, and fermented, purified air being meanwhile forced in through the pipe *e* from the purifier *e'*. The wort in the vat H is brought into fermentation by introducing pressed yeast, and since this yeast is not in full fermenting activity the wort is liable to be infected. As the yeast to be grown from this wort is required to be particularly pure, since it is to form the mother-yeast for the vats G and F, it may be desirable to boil the wort in the vat H and after boiling to cool it down to the fermenting temperature by means of purified air, as above mentioned. As the volume of this wort is only about one sixty-fourth of the whole of the wort obtained from the mash in the vat A, the reduction in the yield of spirits caused by boiling it is inappreciable in view of the advantages gained by the purer fermentation. After this mash has been fermented the pure mother-yeast so obtained in full growth is passed into the vat G, wherein it produces another larger crop of yeast, which in its turn is introduced into the wort in the main vat F to provoke fermentation therein. By adopting this method of procedure I am enabled to effect a very considerable reduction in the amount of pressed or other externally-obtained yeast required for the fermentation of the wort. In most cases less than one-quarter of the amount generally employed is sufficient, since the only externally-obtained yeast required is that employed for starting the fermentation in the smallest vat H. After the fermentation in the main vat F is completed the yeast produced is run through the pipe *h* into the settling-tank J, in which the fermented wort is removed from the yeast and allowed to run through the pipe *k* into the vat K. This vat contains the solid matter previously separated from the peptonized but unfermented mash by means of the filter-press D, this solid matter having entered via the pipe or passage *l*, so much spent wash, ordinary water, or such water as results from the pressing or washing of the yeast being added to made it sufficiently moist to render fermentation possible. Yeast is added to the mixture as soon as the fermented wort comes into the vat K and the whole fermented. The fermented wort and the fermented solid matter thus combined are afterward passed through the pipe *m* into the distilling apparatus L, where the spirit is removed. The residue is then allowed to run through the pipe *n* into the settling-tank M, when the clear spent wash is decanted off and transferred to the tank B and the solid residue may be removed to serve for cattle-food.

In the part of the process described in the preceding paragraph the remaining solid matter (grains) of the malt or raw grain from which the wort has been extracted for the making of spirits or yeast or beer can be made serviceable to augment the production of yeast and spirits in a future operation. This result is obtained by mixing the solid matter (grains) with spent wash at a suitable temperature, whereby the albuminous matters still contained in this solid residue of the malt or raw grain are brought into solution and peptonized, and any sugar that may still be contained in these solid matters is absorbed by the spent wash. When the peptonization has been completed, the clear part of the mixture is decanted and used instead of the ordinary spent wash in the tank B in a succeeding operation, whereby, owing to the great richness of this extract of albuminous matters specially suitable for yeast-food, a large yield of yeast will be obtained, while the sugar which has been extracted out of these solid matters by the spent wash is decomposed by the action of yeast, and thus augments the yield of spirit. Instead of spent wash this solid matter in question can also be mixed with water, in which case, however, it is advisable to provoke an acid fermentation in this solid matter before the addition of the water, so as to promote the solution of the solid matter and permit peptonization.

Although I have hereinabove referred to the peptonization of the solid matter, some of the albuminous substances in solution will or may also be peptonized by the treatment with the spent wash as above set forth.

My improved process is applicable for the treatment of wort made of rolled green malt of barley, rye, wheat, or any other kind of grain, alone or conjointly with ground, rolled, cooked, steamed, or in any other way prepared unmalted grain or materials proper to this manufacture.

I do not claim, broadly, the use of spent wash or slop in the preparation of yeast, as I am aware that processes have been heretofore devised in which spent wash or slop is so used; but one object of my present invention is to utilize the valuable yeast-food contained in the solid matters of the mash either before or after the latter are separated or extracted to produce the clear wort before fermentation; and I am not aware that any process has ever before been devised in which the yeast-food from such solid matters is utilized in the production of yeast.

What I claim is—

1. A process of producing yeast, in which process the saccharified mash is mixed with spent wash, and the mixture is then left without any addition of yeast until the albuminous matters are peptonized, substantially as hereinbefore described.

2. The herein-described process of manufacturing yeast, consisting in first preparing a mash in the usual manner, then allowing this mash to saccharify, and, before the solid matters are separated or extracted therefrom, peptonizing the albuminous substances in the saccharified materials by the addition thereto of spent wash, then extracting the solid matter, and independently fermenting the wort and the said solid matter, as, and for the purposes, set forth.

3. The improved process of manufacturing yeast, consisting in first preparing a mash in the usual manner, then allowing this mash to saccharify, and, before the solid matters are separated or extracted therefrom, peptonizing the albuminous substances in the saccharified materials by the addition thereto of spent wash, then extracting the solid matter and independently fermenting the wort and the said solid matter by adding thereto a nearly-fermented wort, substantially as, and for the purposes specified.

4. The improved process of manufacturing yeast, consisting in first preparing a mash in the usual manner, then allowing this mash to saccharify, and, before the solid matters are separated or extracted therefrom, peptonizing the albuminous substances in the saccharified materials by the addition thereto of spent wash, then extracting the solid matter and independently fermenting the wort and the said solid matter by adding to the same a nearly-fermented wort obtained by first sterilizing a small quantity of wort by heating it to a suitable temperature, then cooling it and provoking a pure fermentation in it, and then utilizing this quantity to provoke fermentation in a larger quantity, substantially as, and for the purpose, above specified.

5. The improved process of manufacturing yeast, consisting in first preparing a mash in the usual manner, then allowing this mash to saccharify and, before the solid matters are separated or extracted therefrom, peptonizing the albuminous substances in the saccharified materials by the addition thereto of spent wash without any addition of yeast, then extracting the solid matter and independently fermenting the wort and the said solid matter by adding fermenting wort thereto and then aerating the fermenting material, substantially as described.

6. The improved process of manufacturing yeast, consisting in first preparing a mash in the usual manner, then allowing this mash to saccharify and, before the solid matters are separated or extracted therefrom, peptonizing the albuminous substances in the saccharified materials by the addition thereto of spent wash without any addition of yeast, then extracting the solid matter and independently fermenting the wort and the said solid matter, separating the yeast from the wort, mixing together and distilling the fermented wort and solid matter and employing the wash resulting from such distillation for peptonizing the mash in a succeeding operation, substantially as described.

7. An apparatus for the manufacture of yeast, comprising a mashing-vat, a spent-wash tank, communicating pipes between said mashing-vat and said tank, a filter for extracting the solid matter from the wort, a series of fermenting-vats successively increasing in size, pipes to permit the heating, cooling and aeration of the wort in said fermenting-vats, pipe connections between said filter and said fermenting-vats, a yeast-separating vat, a final fermenting-tank and pipe connections or passages between said filter and yeast-separating tank and said final fermenting-tank, substantially as, and for the purposes, hereinbefore described.

8. An apparatus for the manufacture of yeast, comprising a mashing-vat, a spent-wash tank, communicating pipes between said mashing-vat and said tank, a filter for extracting the solid matter from the wort, a series of fermenting-vats, successively increasing in size, pipes to permit the heating, cooling and aeration of the wort in said fermenting-vats, pipe connections between said filter and said fermenting-vats, a yeast-separating vat, a final fermenting-tank and pipe connections or passages between said filter and yeast-separating tank and said final fermenting-tank, a distilling apparatus for distilling the residue from said final fermentation, a settling-tank for the wash from such distillation, and a pipe connection between said settling-tank and said spent-wash tank, substantially as, and for the purposes, hereinbefore described.

9. An apparatus for the manufacture of yeast, comprising a mashing-vat, a spent-wash tank, a mixing-tank, communicating pipes between said mixing-tank and the mashing-vat and spent-wash tank, a filter for extracting the solid matter from the wort, a series of fermenting-vats successively increasing in size, pipes to permit the heating, cooling and aeration of the wort in said fermenting-vats, pipe connections between said filter and said fermenting-vats, a yeast-separating vat, a final fermenting-tank and pipe connections or passages between said filter and yeast-separating tank and said final fermenting-tank, substantially as, and for the purposes, hereinbefore described.

HERMAN JANSEN.

Witnesses:
M. REGEN,
CHARLES BROWN.